United States Patent [19]

Gruenwald et al.

[11] Patent Number: 5,349,746
[45] Date of Patent: Sep. 27, 1994

[54] PROCESS FOR THE MANUFACTURE OF A FORCE SENSOR

[75] Inventors: Werner Gruenwald, Gerlingen; Kurt Schmid, Ditzingen; Martin Mast, Gerlingen, all of Fed. Rep. of Germany

[73] Assignee: Robert Bosch GmbH, Stuttgart, Fed. Rep. of Germany

[21] Appl. No.: 956,892

[22] PCT Filed: Apr. 29, 1991

[86] PCT No.: PCT/DE91/00359

§ 371 Date: Nov. 30, 1992

§ 102(e) Date: Nov. 30, 1992

[87] PCT Pub. No.: WO91/17415

PCT Pub. Date: Nov. 14, 1991

[30] Foreign Application Priority Data

May 7, 1990 [DE] Fed. Rep. of Germany ....... 4014511

[51] Int. Cl.[5] ............................................ H01C 17/06
[52] U.S. Cl. .................................. 29/620; 29/621.1; 338/4; 427/103; 264/272.18

[58] Field of Search ................... 29/620, 621.1; 338/4; 427/103; 264/272.18, 316; 156/344

[56] References Cited

U.S. PATENT DOCUMENTS

| 3,298,863 | 1/1967 | McCusker | 427/103 |
| 3,626,256 | 12/1971 | Brown | 317/234 |
| 5,070,596 | 12/1991 | Gaul et al. | 29/620 |

FOREIGN PATENT DOCUMENTS 3912280 10/1990 Fed. Rep. of Germany.

*Primary Examiner*—P. W. Echols
*Attorney, Agent, or Firm*—Spencer, Frank & Schneider

[57] ABSTRACT

A process and a device are proposed for manufacturing sensors, particularly those intended for the determination of pressure forces. In thick-film technology, initially at least one insulating layer (14) is produced on a pressure support (10), whereupon a pressure-sensitive resistance layer (12) and finally conductor paths (13) are applied. In a pressing tool (20-22), the layer arrangement (11-14) is then compressed together with a plastic pressure substance (15). Finally, the pressure support (10) is removed from the pressed article.

14 Claims, 1 Drawing Sheet

5,349,746

PROCESS FOR THE MANUFACTURE OF A FORCE SENSOR

STATE OF THE ART

The invention relates to a process and a device for the manufacture of a sensor for the determination of forces acting on the surface of the sensor, with the sensor being constructed in thick-film technology and including at least one thick-film resistor which is preferably applied to an insulating layer disposed on a preferably metal pressure support which has a smooth surface facing the layer arrangement, with the resistor being electrically contacted at at least two spatially separated locations by means of conductor paths, and with the surfaces of the layer arrangement being treated such that they are plane parallel to one another.

A process of this type has been proposed in German Published Patent Application No. DE 3,912,280. This process initially applies a pressure sensor arrangement in thick-film technology onto a steel substrate. Thereafter, the layer arrangement is coated with a casting substance or with another suitable material and is polished in such a way that the sensor surface extends plane parallel to the bottom face of the substrate. In addition to producing plane parallelism, the polishing simultaneously is effected to produce the least possible surface roughness since good surface pressure is possible only with a completely smooth surface. Therefore, the polishing constitutes a complicated and cost intensive manufacturing step.

It is the object of the invention to provide a process which makes it possible to economically produce a pressure sensor with uniform surface pressure and without costly subsequent working.

SUMMARY ADVANTAGES OF THE INVENTION

The above object generally is achieved according to the present invention by a process for manufacturing a sensor constructed in thick-film technology for the determination of forces acting on the surface of the sensor, which sensor includes at least one thick-film resistor which is applied to an insulating layer disposed on a metal pressure support having a smooth surface facing the layer arrangement, with the resistor being electrically contacted at at least two spatially separated locations by means of conductor paths, and with the surfaces of the layer arrangement being treated such that they are plane parallel to one another; and wherein the pressure support surface to be provided with the layer arrangement is polished smooth and the pressure support is removed once the production of the layer arrangement is completed.

The sensor produced according to the invention in thick-film technology is distinguished by a very smooth surface which permits excellent surface pressure characteristics combined with an increase in sensitivity and low hysteresis. A costly subsequent treatment of the individual sensor in order to produce a smooth surface is no longer required. Instead, it is merely necessary to polish the pressure surface just once to make it smooth; it can then be re-used for any desired number of manufacturing processes. The active layer of a conductive plastic material exhibits a pressure resistance characteristic that is substantially linear over a large area. The sensors are mechanically very robust and independent of the temperature over a broad range. A plurality of geometric configurations is possible. For example, with appropriate configuration of pressing tool and pressure support, any exterior shaping is possible such as, for example, the shape of a plain washer or a rod shape. However, the thick-film technology also makes it possible to give the sensor, with a fixed exterior shape, various surface subdivisions. For example, for a disc-shaped sensor it is possible to configure the active layer either parallel to the edge of the disc or in a meander shape.

BRIEF DESCRIPTION OF THE DRAWINGS

One embodiment of the invention is illustrated in the drawing and will be described in greater detail below.

DETAILED DESCRIPTION OF THE PREFERRED EMBODIMENT

In a preparatory process step, the surface of a pressure support 10 is polished to a high gloss. The surface profile produced thereby will appear as a negative imprint on the sensor surface 31 to be produced. Thus, the surface roughness of the finished sensor is determined by the surface roughness of the pressure support. The working of the surface 1 of pressure support 10 must therefore be performed with an effort appropriate for the desired quality of the sensor surface 31. Steel is employed as the material for pressure support 10. Aluminum and ceramic materials are also suitable.

Figure 1:
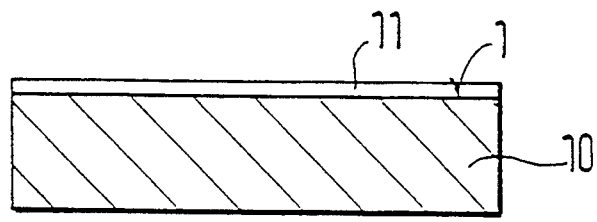
FIG. 1 is a sectional view of the pressure support that has been wetted with a release agent.

In the first process step, FIG. 1, the smoothly polished surface of pressure support 10 is wetted, preferably completely, with a release agent 11. However, this step may be omitted if a paste into which a release agent has already been mixed is employed for the thick-film arrangement applied thereto.

Figure 2:
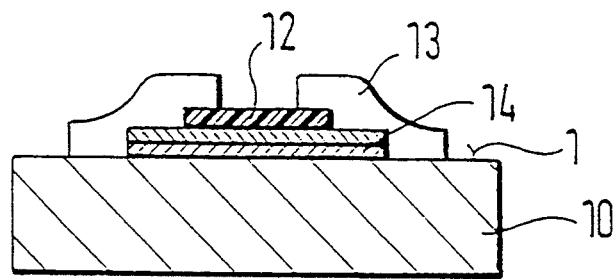
FIG. 2 is a sectional view of the pressure support after application of the sensor layer arrangement, with the center release layer being omitted.

In the second process step, FIG. 2, an insulating layer 14 is initially screen-printed onto the highly polished side 1 of pressure support 10. This insulating layer may selectively cover the entire surface of the pressure support except for the contacts. Advisably, however, it covers only that part of surface 1, to which a resistance path 12 is subsequently applied. In order to exclude a direct connection of resistance path 12 with surface 31, insulating layer 14 should have a surface area which slightly exceeds the surface area of resistance path 12. Particularly in view of the compression of the individual layers, a polymer paste, preferably including phenol resin as binder, is suitable as material for insulating layer 14. The thickness of insulating layer 14 lies advisably at 20 to 25 µm. Since an individual insulating layer frequently still contains impurities, further insulating layers should generally be provided to ensure freedom of pores and thus good insulating properties. Two to three layers have been found to be sufficient for a layer thickness of 20 µm.

A pressure sensitive resistance layer follows insulating layer 14 and constitutes resistance path 12. The structure desired for resistance path 12 is printed on in a mirror image. The resistance layer is preferably composed of a conductive plastic material. Compared to other pressure sensitive materials which could also be employed, in principle, this has the advantage that it can be very intimately bonded to other layers that are likewise constructed on a plastic basis. Well suitable conductive plastic materials are pastes based on phenol resin as they can be obtained, for example, from the firm TOCOS, Japan, Series 4,200. The thickness of pressure sensitive layer 12, as well as that of the insulating layer, is preferably 20 to 25 μm; however, layer thicknesses that clearly differ from this value are also possible. In connection with greater layer thicknesses it must be considered that, due to the then larger path cross section, the path resistance and thus also the measurement signal decrease. If this is to be counteracted, the selection of a material having a higher specific resistance can provide compensation. Smaller layer thicknesses can also be realized; in that case, a sufficiently fine-grained and correspondingly low-ohmic paste material should be employed.

As a third layer, an electrically conductive layer, preferably of a conductive polymer paste is applied for contacting the pressure sensitive resistance paths and for forming conductor paths 13. Conductor paths 13 are advisably applied along the edges of the resistance path in such a way that they overlap the edges of resistance path 12 as well as the edges of insulating layers 14 disposed therebelow and end on the pressure support.

In the described embodiment, later contacting of the sensor is intended to be effected from the sensor surface. If however, the contacting of the sensor is to take place from the rear, it is not necessary to apply the conductor paths so that they are adjacent the surface of the pressure support. If necessary, other special devices such as, for example, plug-in connections to establish contacts with the exterior must be provided in this case.

Figure 3:
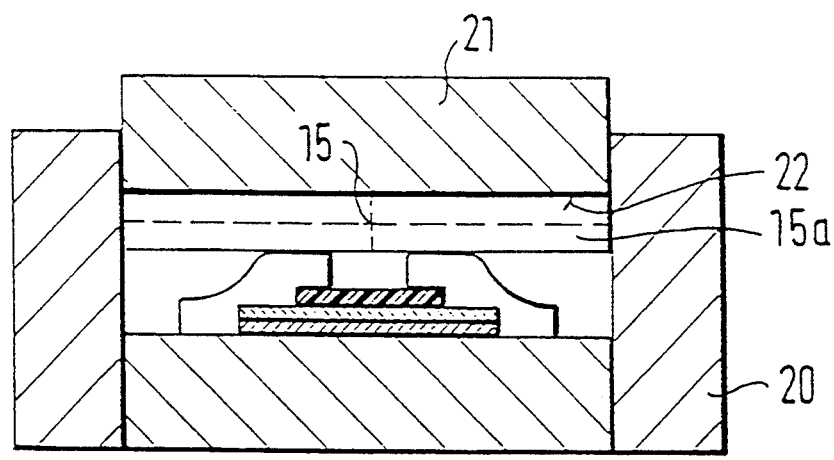
FIG. 3 is a sectional view of the pressing tool with a plastic pressure substance disposed therein and a sensor arrangement according to FIG. 2 inserted.

For the third process step, FIG. 3, a plastic pressing substance 15 is initially put into a pressing tool 20 to 22. A mold that is open toward one side and preferably has removable side members 20 and a movable bottom member 21 is employed as pressing tool 20 to 22. The surface 22 of bottom member 21, that is, the surface oriented toward the interior of the pressing mold, is polished smooth. The configuration of the side members 20 of pressing tool 20 to 22 determines the exterior shape of the later sensor. If shapes including recesses are desired such as, for example, the shape of a plain washer, appropriate measures must be taken in pressing tool 20 to 22. Duroplasts, particularly diallyl phthalate, abbreviated as DAP, as well as phenol have been found to be well suitable plastic pressing substance materials. Both substances are powdery at room temperature. They are therefore advisably put into tablet shape 15a for better handling. The pressing substance material is then put into pressing tool 20 to 22. In order for the initially rigid starting material to become plastically deformable, the pressing process is performed at elevated temperature. The temperature should here be selected high enough that the plastic material converts to the viscous phase, but low enough that no carbonization takes place in the layer arrangement, particularly at the pressure sensitive resistance paths. A temperature from 130° C. to 180° C., preferably of about 150° C., has been found to be suitable for the described arrangement.

If materials other than those based on a plastic are employed for the layer arrangement or the pressing substance, an appropriately adapted temperature should be selected if required. The pressure to be applied during the pressing process, with which the plastic pressing substance 15 is compressed with layer arrangement 11-14, should be selected high enough that the resulting pressed article has sufficient hardness. Advisable is a pressure of at least 20 N/mm². Pressures beyond this are possible; at very much higher pressures it is necessary to consider that the layer structure may be destroyed.

Figure 4:
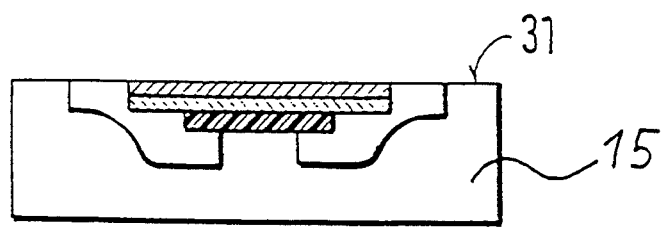
FIG. 4 is a sectional view of the finished pressed article.

Finally, the pressed article, FIG. 4, is hardened in air at a temperature from 120° to 200° C. The precise temperature and duration of hardening here depend individually on the type of resin employed and on the furnace system available in each case. They should be selected so that complete polymerization of the pressed article, FIG. 4, and complete expulsion of the solvents present in the pressed article, FIG. 4, take place.

Upon completion of the pressing process, the pressed article, FIG. 4, produced by the compression of layer arrangement 11 to 14 with plastic pressing substance 15 is separated from the pressure support. After removal of any possible release agent remainders, the sensor surface 31 is exposed, further treatment is not necessary.

With appropriate preparation of the surface 1 of pressure support 10, a value of less than 0.5 μm can easily be realized for the smoothing depth of sensor surface 31. Pressure support 10 can be re-used for the manufacture of further sensors.

In expansion of the described embodiment, FIGS. 1 to 4, several resistance paths 12 can be placed together with a correspondingly larger number of conductor paths 13 on a single sensor.

The described process further permits simultaneous and therefore economical manufacture of a plurality of sensors in one process phase. For this purpose, pressure support 10 and the tools to implement the process, particularly pressing tool 20 to 22, should be dimensioned large enough that several sensors can be arranged next to one another on the same pressure support 10. Moreover, the process can be implemented as described for the embodiment. The individual sensors are obtained by separating them out of the finished pressed article.

We claim:

1. A process for manufacturing a sensor constructed in thick-film technology for the determination of forces acting on a surface of the sensor, the sensor including; at least one thick-film resistor which is applied to an insulating layer disposed on a metal pressure support, the latter having a smooth surface facing the layer arrangement; the resistor is electrically contacted at at least two spatially separated locations by means of conductor paths, with the surfaces of the layer arrangement being treated such that they are plane parallel to one another; and wherein the pressure support surface to be provided with the layer arrangement is polished smooth and the pressure support is removed once the production of the layer arrangement is completed.

2. A process according to claim 1, wherein the layer arrangement is treated by being compressed in a pressing tool together with a plastic pressing substance.

3. A process according to claim 2, wherein compressing takes place at an elevated temperature, with the temperature being selected, on the one hand, high enough that the plastic pressing substance becomes plastically deformable and, on the other hand, low enough that no carbonization occurs in the layer arrangement.

4. A process according to claim 2, wherein the pressed article produced during the compression is hardened at an elevated temperature of 120° to 200° Celsius.

5. A process according to claim 1, wherein the surface of the pressure support facing the layer arrangement was wetted with a release agent before the layer arrangement was applied.

6. A process according to claim 1, wherein pastes into which a release agent has been mixed are employed for the layer arrangement.

7. In a process for manufacturing a sensor constructed in thick-film technology for the determination of forces acting on a surface of the sensor, said process including the steps of providing a metal pressure support having a substantially flat surface, applying a layer arrangement to the flat surface with the layer arrangement including at least one thick-film resistor layer disposed on at least one insulating layer which is disposed on the flat surface of the metal pressure support, electrically contacting the resistor layer at at least two spatially separated locations by means of conductor paths, and treating the opposed outer surfaces of the layer arrangement such that they are plane parallel to one another; the improvement comprising: polishing smooth the flat surface of the pressure support prior to the step of applying a layer arrangement; and removing the pressure support once the production of the layer arrangement is completed.

8. A process according to claim 7, wherein the step of treating includes pressing the layer arrangement in a pressing tool together with a plastic pressing substance.

9. A process according to claim 8, comprising carrying out the step of pressing at an elevated temperature, with the temperature being selected high enough that the plastic pressing substance becomes plastically deformable and low enough that no carbonization occurs in the layer arrangement.

10. A process according to claim 9, wherein the elevated temperature is between approximately 120° and 180° Celsius.

11. A process according to claim 9, further comprising hardening the pressed article produced during the step of pressing at a temperature of approximately 120° to 200° Celsius.

12. A process according to claim 8, further comprising hardening the pressed article produced during the step of pressing at a temperature of approximately 120° to 200° Celsius.

13. A process according to claim 7, further comprising the step of wetting the flat surface of the pressure support with a release agent before the step of applying a layer arrangement.

14. A process according to claim 7, wherein pastes into which a release agent has been mixed are employed for the layer arrangement during the step of applying.

* * * * *